Oct. 17, 1933.  A. D'AMICO  1,930,836
ELECTRIC OVEN
Filed June 13, 1931

INVENTOR
Angelo D'Amico
BY
ATTORNEY

Patented Oct. 17, 1933

1,930,836

UNITED STATES PATENT OFFICE 1,930,836

ELECTRIC OVEN

Angelo D'Amico, Stockton, Calif.

Application June 13, 1931. Serial No. 544,071

4 Claims. (Cl. 219—36)

This invention relates to electric ovens or furnaces and especially to devices of this character such as are adapted for use in dental and general laboratory work.

The principal objects of my invention are to provide an oven of this nature in which an extremely even and high heat may be generated and maintained over the entire area of the oven: one in which the heat will be transmitted to the oven chamber with a minimum of less and without the heating element being actually in the chamber itself; and one in which the heating element is always kept from contact with the oxygen of the air so that there is no tendency for it to deteriorate and possibly burn out from this cause.

I have also arranged as a unit with the oven an automatic and adjustable temperature control means, so that the oven heat may be set and held at whatever temperature may be necessary for the particular work in hand.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
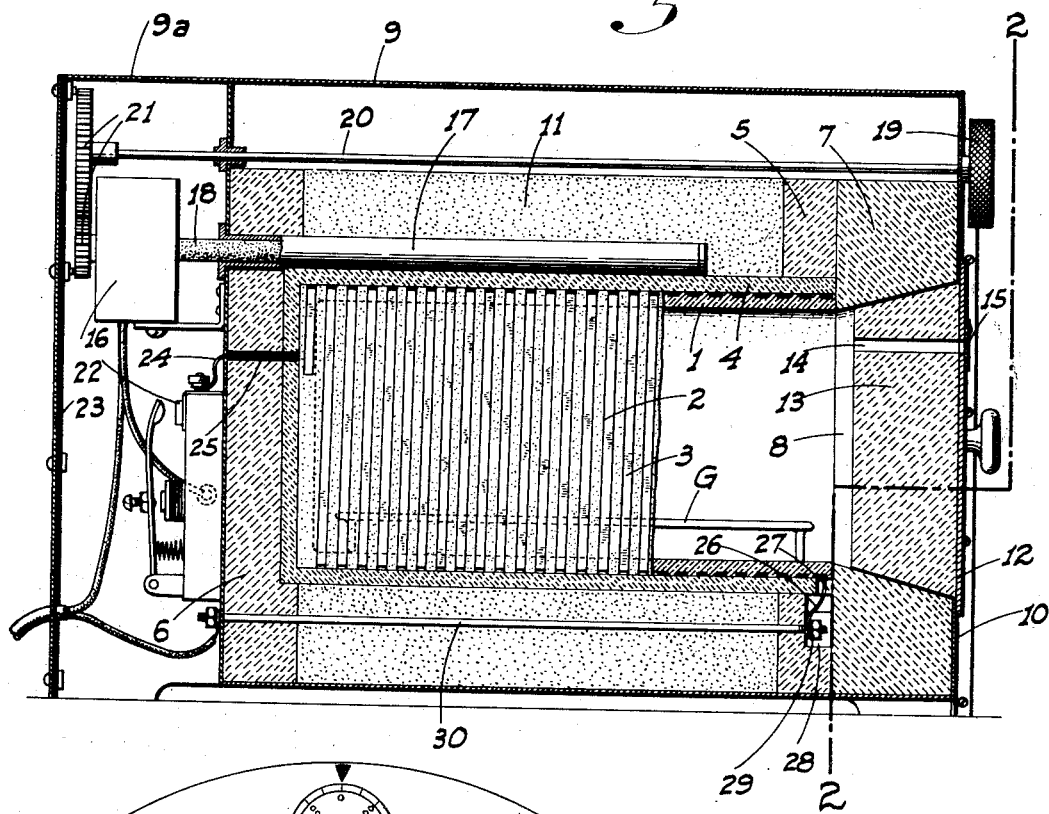
Fig. 1 is a sectional elevation of the oven.
Figure 2:
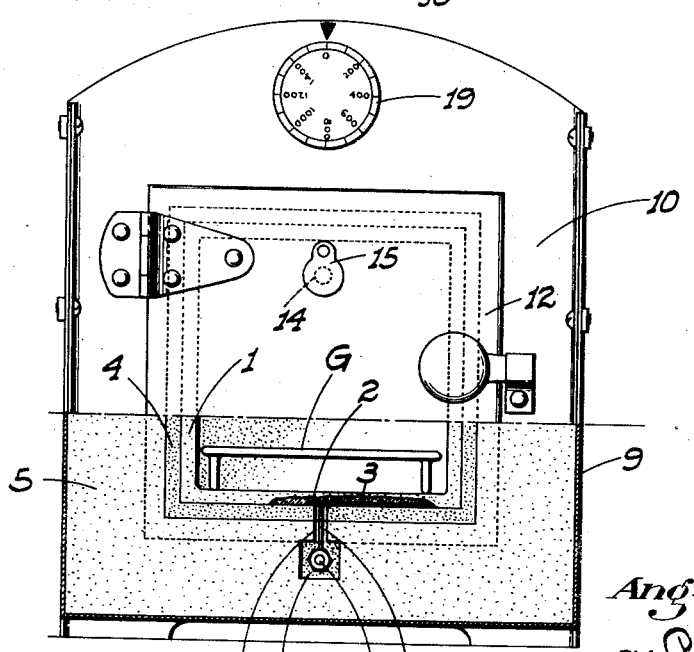
Fig. 2 is an end view of the oven partly in section as on the line 2—2 of Fig. 1.

Referring now more particularly to the characters of reference on the drawing, the oven chamber comprises a rectangular box-like shell 1, freely opened at its front end. This shell is constructed as a one-piece member of a material having a very high fusing point and very great heat conductivity such as high grade fire clay. This shell is provided throughout its length with a flat spirally cut groove 2, in which is disposed a ribbon 3 of nichrome wire forming the heating element, the thickness of the ribbon being less than the depth of the groove. A suitable grate G is removably mounted in the oven chamber and is arranged to support the member to be melted.

The shell 1 removably fits into a similarly shaped but correspondingly larger shell 4 of a material having also a high fusing point, and made of fireclay, porcelain, or other suitable material, these two shells constituting what is known in the art as a muffle. The shell 4 is supported at its front and back ends by one-piece relatively large molded slabs 5 and 6 respectively made of diatex or other material having good heat insulating properties. The shell 4 projects through the slab 5 so as to be flush with its front face, as is also the front edge of the oven shell. The back end of the shell 5 however is merely recessed into the shell 6 as shown. The inner shell is not cemented to the outer shell or permanently secured thereto in any way, so that said inner shell can be removed at any time if it is necessary to replace the heating ribbon.

To normally hold the inner shell in place against removal I provide another molded slab 7 in front of and abutted against the slab 5. The slab 7 has an outwardly flaring opening 8 which is the same size at its inner end as the interior area of the oven shell. All the slabs are enclosed in a metal casing 9 which forms the exterior of the oven structure; said casing including a removable front plate 10 whose removal exposes the slab 7 for removal. The space inside the casing between the slabs 5 and 6 and the outer shell is filled with a suitable heat insulating material 11, preferably powdered diatex.

The plate 10 has an opening of the same size as that of the opening 8 at its outer end, and is covered by a door. This door comprises a metal plate 12 hinged onto the plate 10 and a heat insulating block 13 conforming to the shape of and fitting within the opening 8. A gas vent 14 projects through the door toward the top and is covered on the outside by an adjustable valve flap 15.

The heat generated in the oven by the functioning of the element is regulated and automatically controlled as follows:

Preferably mounted in connection with the casing at the back of the oven is a manually adjustable thermostatically controlled relay unit 16 of standard character, whose operation is governed by a thermostat exposed to the heat of the oven. This thermostat preferably comprises a fixed nichrome tube 17 projecting into the casing along the top of the outer shell, and a carbon rod 18 in the tube. With this mounting of the thermostat, it is not directly subjected to the intense heat of the oven shell but to the lesser heat of the outer shell. It will last indefinitely therefore without deterioration while at the same time it is sufficiently sensitive in its action for all practical purposes. The unit 16 is set for definite oven heats by a rotatable dial knob 19 mounted at the front of the casing and having a shaft 20 extending lengthwise through the casing, which is connected to the unit 16 by suitable gearing 21. In this manner the setting of the relatively concealed and out-of-the-way unit is rendered very convenient. The mechanism of the unit is of course proportioned and set so that the adjustment of the dial governs and indicates the actual heat in the oven chamber rather than the lesser heat in the zone of the thermostat itself.

The closing of the relay of the unit closes a suitable switch 22 also mounted on the back of the casing. To conceal and protect the relay and switch members, the casing is formed with a rearward extension 9a having a removable back plate 23 so that said members are rendered accessible for inspection or adjustment whenever necessary. Although these control members are mounted as a unitary part of the oven structure, it will be seen that they are protected from any intense heat by the slab 6 which is between the oven and the control members, and which as previously stated is a heat insulating material.

In order to facilitate the assembly or removal of the oven shell when necessary, without tearing down the entire structure, the rear termination of the heating element is provided with a wire 24 which extends through a passage 25 cut through the back of the outer shell and the slab 6 and connects to the adjacent binding post of the switch. The front end of the element is provided with a wire 26 which depends through a slot 27 in the front end of the shell 4 and into a recess 28 provided in the front end of the slab 5. This recess contains a binding post 29 to which the wire is connected and which is exposed whenever the slab 7 is removed. A conductor 30 from the post extends through the casing to the rear end of the same, where the other wire of the circuit may be readily connected thereto as shown. It will be seen therefore that to remove the oven shell it is only necessary to remove the front casing plate 10 and the slab 7, disconnect the wires 24 and 26 from their binding posts, and withdraw said shell.

Owing to the mounting of the oven shell as above described, practically all the heat generated by the element is radiated to the interior of the oven; and the element being all around said oven a very even heat is maintained throughout its area. Also the element is nowhere exposed to the atmosphere so that the deteriorating effects due to oxidization are avoided. The element ribbon being thinner than the depth of the groove in which it is fitted, and not being imbedded in the shell, said ribbon is free to expand without restraint and without tending to fracture or disturb the shell.

From the foregoing description it will be readily seen that I have produced such a device as susbtantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An electric oven comprising a muffle open only on one end and forming the oven chamber, an electric heating element directly associated with the muffle, an outer shell in which the oven shell is fitted, relatively large heat insulating slabs in which the ends of the outer muffle are seated whereby to support said shell, a casing enclosing and supporting the slabs, and a heat insulating medium filling the casing between the slabs.

2. An electric oven comprising a shell open only on one end and forming the oven chamber, an electric heating element directly associated with the shell, an outer shell in which the oven shell is fitted, and being removable from the front end of said outer shell, spaced slabs in which the ends of the outer shell are seated whereby to support said shell, the forward face of the front slab being flush with the open end of the shells, another slab abutted against said front slab and having an opening therethrough the same size as that of the oven chamber, and a door over said last named slab opening.

3. A structure as in claim 2, with a casing surrounding and supporting all said slabs, and a removable front plate for said casing holding the last mentioned slab against removal; the door being mounted in connection with said plate.

4. An electric oven and control unit comprising a furnace chamber open at its front end, a heating element in the oven, a circuit for the element, a switch in the circuit mounted behind the chamber in close relation thereto, an adjustable relay interposed in the circuit for controlling the switch and also mounted behind the furnace chamber, a thermostat device mounted in connection with the chamber and relay and affected by over heat for controlling the operation of the relay, and means to adjust the relay comprising a rod mounted above and extending along the exterior of the chamber from back to front, a control knob on the front end of the rod, and connections between the back end of the rod and the adjustment mechanism of the relay.

ANGELO D'AMICO.